(12) United States Patent
Fuse et al.

(10) Patent No.: US 11,407,148 B2
(45) Date of Patent: Aug. 9, 2022

(54) HEATING APPARATUS FOR THERMOPLASTIC RESIN SHEET AND METHOD OF MANUFACTURING THERMOPLASTIC RESIN-MOLDED BODY

(71) Applicant: Toray Industries, Inc., Tokyo (JP)

(72) Inventors: Mitsuki Fuse, Nagoya (JP); Masaru Tateyama, Nagoya (JP); Akihiko Nishizaki, Nagoya (JP); Kazuhisa Kodaira, Tokyo (JP); Kuniko Fujita, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 171 days.

(21) Appl. No.: 16/958,796

(22) PCT Filed: Dec. 25, 2018

(86) PCT No.: PCT/JP2018/047525
§ 371 (c)(1),
(2) Date: Jun. 29, 2020

(87) PCT Pub. No.: WO2019/138862
PCT Pub. Date: Jul. 18, 2019

(65) Prior Publication Data
US 2021/0069938 A1 Mar. 11, 2021

(30) Foreign Application Priority Data
Jan. 12, 2018 (JP) .............................. JP2018-003333

(51) Int. Cl.
*B29C 35/02* (2006.01)
*B29C 70/46* (2006.01)
(Continued)

(52) U.S. Cl.
CPC ............ *B29C 35/02* (2013.01); *B29C 70/465* (2013.01); *B32B 27/08* (2013.01);
(Continued)

(58) Field of Classification Search
None
See application file for complete search history.

(56) References Cited

U.S. PATENT DOCUMENTS 4,634,840 A   1/1987  Yamagishi et al.
4,752,204 A * 6/1988  Kataoka ................. B29C 43/52
                                                    264/327
(Continued)

FOREIGN PATENT DOCUMENTS

EP    0970792 A2 *  1/2000
GB    2 040 801 A    9/1980
(Continued)

OTHER PUBLICATIONS

Machine Translation of PCT WO 2006/068068, Date Unknown.*

*Primary Examiner* — Jeffry H Aftergut
(74) *Attorney, Agent, or Firm* — DLA Piper LLP (US)

(57) ABSTRACT

A heating apparatus that heats a thermoplastic resin sheet includes a vertically-movable heating wall that is indirectly heated with a saturated steam of a heat medium and heats the thermoplastic resin sheet above a melting point of the thermoplastic resin by bringing the heating wall into contact with the thermoplastic resin sheet.

13 Claims, 6 Drawing Sheets

(51) Int. Cl.
  *B32B 27/08* (2006.01)
  *B29K 101/12* (2006.01)
  *B29K 105/08* (2006.01)

(52) U.S. Cl.
  CPC .. *B29K 2101/12* (2013.01); *B29K 2105/0872* (2013.01); *B29K 2995/0012* (2013.01)

(56) References Cited

U.S. PATENT DOCUMENTS

| | | |
|---|---|---|
| 5,878,770 A | 3/1999 | Fujita |
| 2019/0001530 A1 | 1/2019 | Shinfuku et al. |

FOREIGN PATENT DOCUMENTS

| | | | |
|---|---|---|---|
| JP | 57-83424 | A | 5/1982 |
| JP | 60-79916 | A | 5/1985 |
| JP | 63-15135 | B2 | 4/1988 |
| JP | 10-89507 | A | 4/1998 |
| JP | 2016-147401 | A | 8/2016 |
| WO | 2006/068068 | A1 | 6/2006 |
| WO | WO-2006/068068 | A1 * | 6/2006 |
| WO | 2017/110595 | A1 | 6/2017 |

\* cited by examiner

HEATING APPARATUS FOR THERMOPLASTIC RESIN SHEET AND METHOD OF MANUFACTURING THERMOPLASTIC RESIN-MOLDED BODY

TECHNICAL FIELD

This disclosure relates to a heating apparatus for thermoplastic resin sheet and a method of manufacturing thermoplastic resin-molded body using the heating apparatus. It specifically relates to an apparatus that precisely and uniformly heats or preheats a fiber-reinforced thermoplastic resin sheet to a predetermined temperature, and a method of manufacturing a molded body by a stamping forming.

BACKGROUND

There is a well-known technology to produce a desirably shaped product by heating and compressing a forming material consisting of discontinuous reinforcing fiber (made of carbon fiber or the like) bundle aggregate (which may be called fiber bundle) and matrix resin.

Fiber reinforced-thermoplastic resin composite material consisting of reinforcing fibers and matrix resin can be subject to a stamping forming process by preheating/heating thermoplastic resin plate to a predetermined temperature to be softened/melted. The heating apparatus may be of an indirect heating-type such as hot wind heating-type characterized by relatively easy control of temperature with high precision less influenced by air temperature outside the heating furnace, although this type of heating apparatus takes long time for heating. Therefore, a heating apparatus of radiation heating-type characterized by radiating electromagnetic wave in the infrared or far-infrared range to thermoplastic resin sheet has generally been widely used. A radiation-type heating furnace radiating electromagnetic wave in the infrared or far-infrared range has generally been used for the stamping forming while a near-infrared heater performing heating at a higher temperature and greater thermal flow rate compared to a far-infrared heater tends to have a lower absorption efficiency of plastics. On the other hand, a far-infrared heater performing heating at lower temperature and smaller thermal flow rate compared to a near-infrared heater tends to have a higher absorption efficiency of plastics. Therefore, the far-infrared heater ("IR heater" hereinafter) is often used as a heater for a heating furnace.

The heating furnace using the IR heater is generally provided with upper and lower heaters each sectioned by a plurality of blocks controlled to achieve uniform heating. This type of heating might have a great temperature variability of an object to be heated in spite of advantages such as low cost, good heating efficiency and excellent maintenance characteristics.

The preheating time of a thermoplastic resin sheet is generally several minutes which occupies most of the forming cycle although it depends on the thickness. Further, when the thermoplastic resin sheet is not heated uniformly, the lowest temperature part should be heated above the melting point of the resin. However, such a risen temperature might elongate the preheating time to deteriorate formability as well as physical properties and the appearance because of overheating. Accordingly, it could be helpful to improve the heating method of a thermoplastic resin sheet. For example, the thermoplastic resin sheet can continuously be conveyed with a conveyer automatically with a continuous preheating furnace to improve the formability in stamping forming. However, it is difficult to completely seal the inlet and outlet for a thermoplastic resin sheet with such a continuous preheating furnace having a structure in which thermoplastic resin sheet can hardly be heated uniformly because of influence of outside air.

To uniformly heat the thermoplastic resin sheet, an inner space of the heating furnace may be sectioned into a plurality of areas provided with heaters set to different temperatures for optimization. However, it is still difficult to uniformly heat a large-sized thermoplastic resin sheet because of the complicated influence of radiation from adjacent heaters, radiation from the preheating furnace wall and the surface area difference at the end of the base material.

JP S60-79916 A discloses a temperature control method of a thermoplastic resin sheet by adjusting heater output while measuring the base material temperature with a temperature sensor provided close to the outlet of continuous heating furnace comprising a plurality of heaters. Although that method can control the temperature at sensor measurement points, there is no description about uniform heating of the entire sheet in the document.

Accordingly, it could be helpful to provide a heating apparatus capable of high-speed heating with a low temperature variability when preheating to a predetermined temperature and performing heating treatment, and a method of manufacturing a high-quality thermoplastic resin-molded body by using the heating apparatus.

SUMMARY

We thus provide:

(1) A heating apparatus that heats a thermoplastic resin sheet, comprising a vertically-movable heating wall to be indirectly heated with a saturated steam of a heat medium to heat the thermoplastic resin sheet above a melting point of the thermoplastic resin by bringing the heating wall into contact with the thermoplastic resin sheet.

(2) The heating apparatus according to (1), having a self-sensing function (A) capable of selectively heating a low-temperature part.

(3) The heating apparatus according to (1) or (2), wherein the heat medium is an organic compound.

(4) The heating apparatus according to (1) or (2), wherein the heat medium is an inorganic compound.

(5) A method of manufacturing a thermoplastic resin-molded body, comprising: a step of heating a thermoplastic resin sheet to be fused above a melting point of the thermoplastic resin with a heating apparatus according to any one of (1) to (4); a step of clamping a molding die which comprises an upper die and a lower die and pressurizes the fused thermoplastic resin sheet; and a step of cooling the pressurized thermoplastic resin sheet to be solidified to make a thermoplastic resin-molded body, wherein the heating apparatus comprises a vertically-movable heating wall indirectly heated with a saturated steam of a heat medium to heat the thermoplastic resin sheet above the melting point of the thermoplastic resin by bringing the heating wall into contact with the thermoplastic resin sheet.

(6) The method of manufacturing a thermoplastic resin-molded body according to (5), wherein two or more of the thermoplastic resin sheets are simultaneously heated to be fused with the heating apparatus in the step of heating.

(7) The method of manufacturing a thermoplastic resin-molded body according to (6), wherein the heating apparatus has a self-sensing function (A) capable of selectively heating a low-temperature part.

(8) The method of manufacturing a thermoplastic resin-molded body according to any one of (5) to (7), wherein the thermoplastic resin sheets have different heat capacities and are disposed without being overlapped in the step of heating.
(9) The method of manufacturing a thermoplastic resin-molded body according to any one of (5) to (7), wherein the thermoplastic resin sheets have different heat capacities and are stacked in the step of heating.
(10) The method of manufacturing a thermoplastic resin-molded body according to any one of (5) to (9), wherein the thermoplastic resin sheets have different heat capacities in the step of heating, the molding die has a rib shape, and the thermoplastic resin-molded body having the rib shape is made in the step of cooling.
(11) The method of manufacturing a thermoplastic resin-molded body according to any one of (5) to (9), wherein the thermoplastic resin sheets have different heat capacities in the step of heating, the molding die has a boss shape, and the thermoplastic resin-molded body having the boss shape is made in the step of cooling.
(12) The method of manufacturing a thermoplastic resin-molded body according to any one of (5) to (11), wherein the thermoplastic resin sheet is made of a fiber-reinforced thermoplastic resin made from a thermoplastic resin and reinforcing fibers.
(13) The method of manufacturing a thermoplastic resin-molded body according to (12), wherein the reinforcing fibers include carbon fibers, glass fibers or aramid fibers.

Our heating apparatus thus makes it possible to heat a thermoplastic resin sheet at a high speed and a low temperature variability since it comprises a vertically-movable heating wall indirectly heated with a saturated steam of a heat medium to heat the thermoplastic resin sheet above a melting point of the thermoplastic resin by bringing the heating wall into contact with the thermoplastic resin sheet.

Further, our method makes it possible to simultaneously heat two or more thermoplastic resin sheets having different volumes with the heating apparatus to manufacture a molded-body having a complicated three-dimensional shape such as rib or boss shape.

EXPLANATION OF SYMBOLS

Figure 1:
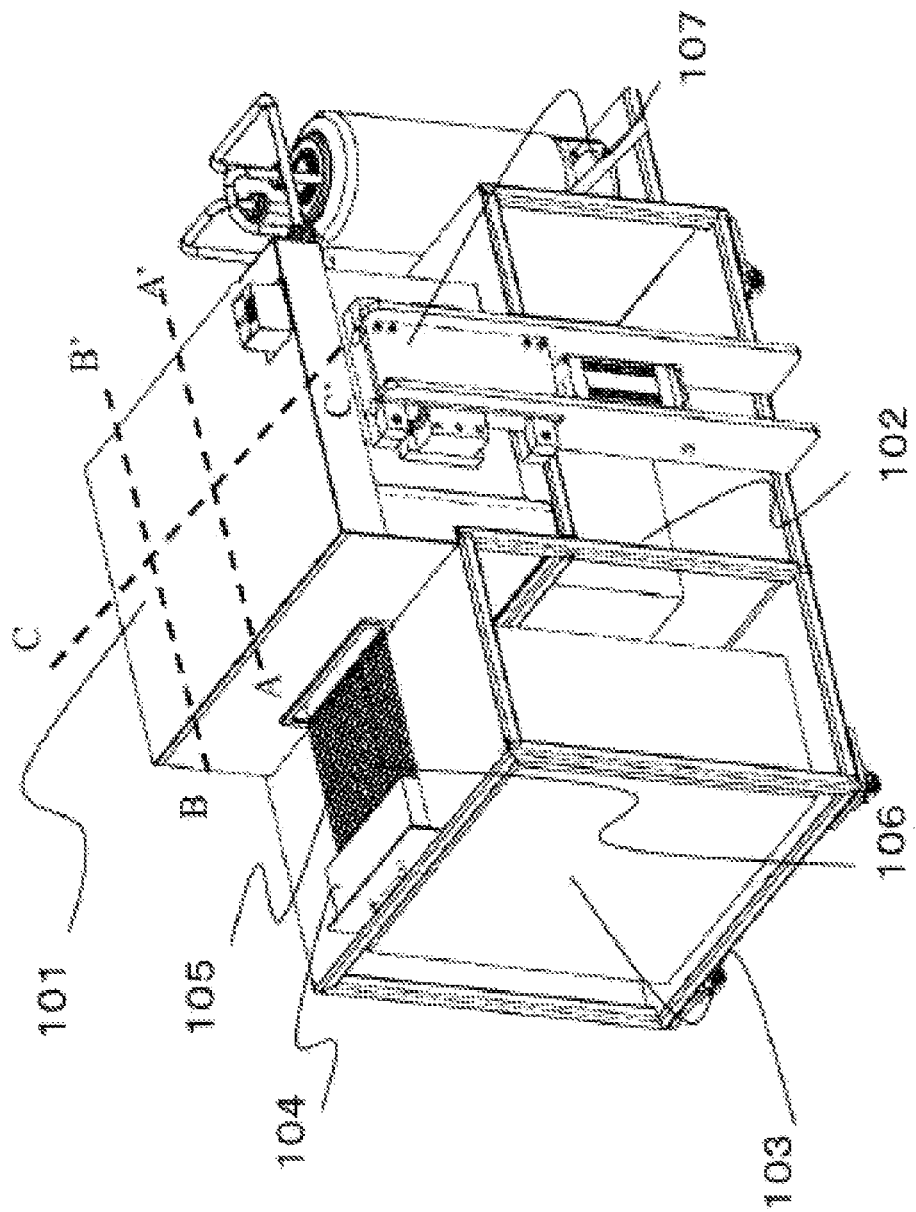
FIG. 1 is an overall view showing our heating apparatus.

101: heating apparatus
102: heating apparatus cabinet
103: operation control panel
104: door
105: base material inlet/outlet
106: slide part
107: cylinder for elevating upper heating wall
201: upper jacket
202: lower jacket
203: heat medium
204: saturated steam
205: heater for heat medium
206: temperature sensor
207: upper heating wall surface
208: lower heating wall surface
209: heat chamber
210: keep-warm box
211: thermoplastic resin sheet (base material)
501: material a for thermometry
502: material b for thermometry
503: thermometric point
601: forming material stack

DETAILED DESCRIPTION

Hereinafter, our apparatus and methods will be explained with reference to the Drawings. This disclosure is, however, not limited in particular to the examples shown in the Drawings. First, the heating apparatus will be explained.

Figure 2:
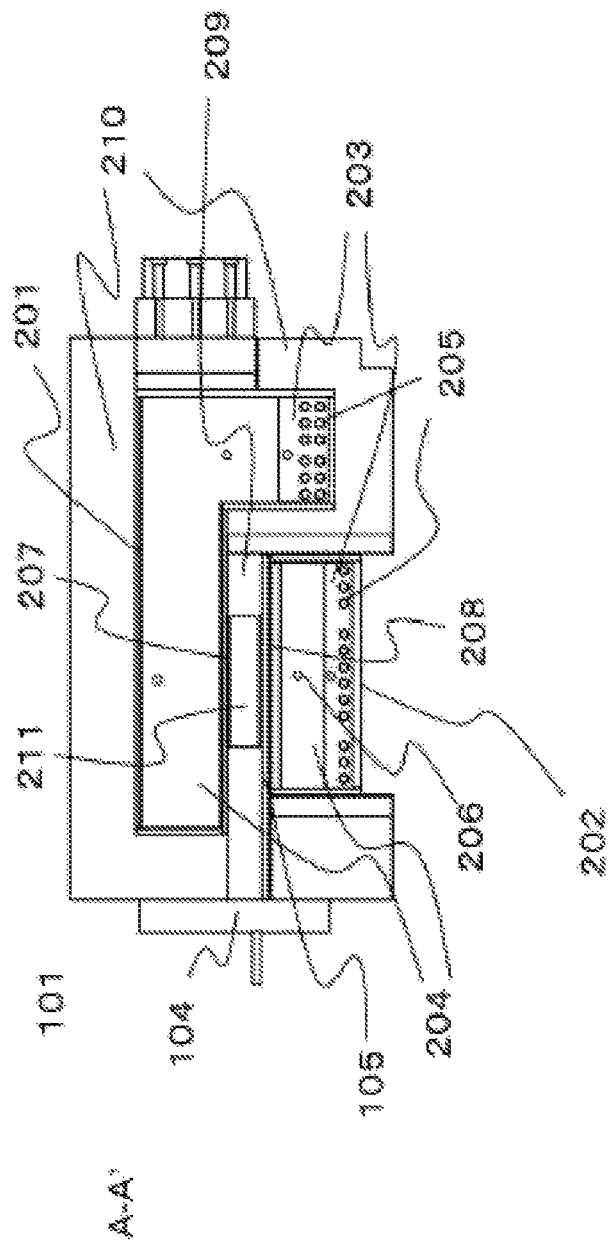
FIG. 2 is a cross-section view of A-A' section of heating apparatus shown in FIG. 1.
Figure 3:
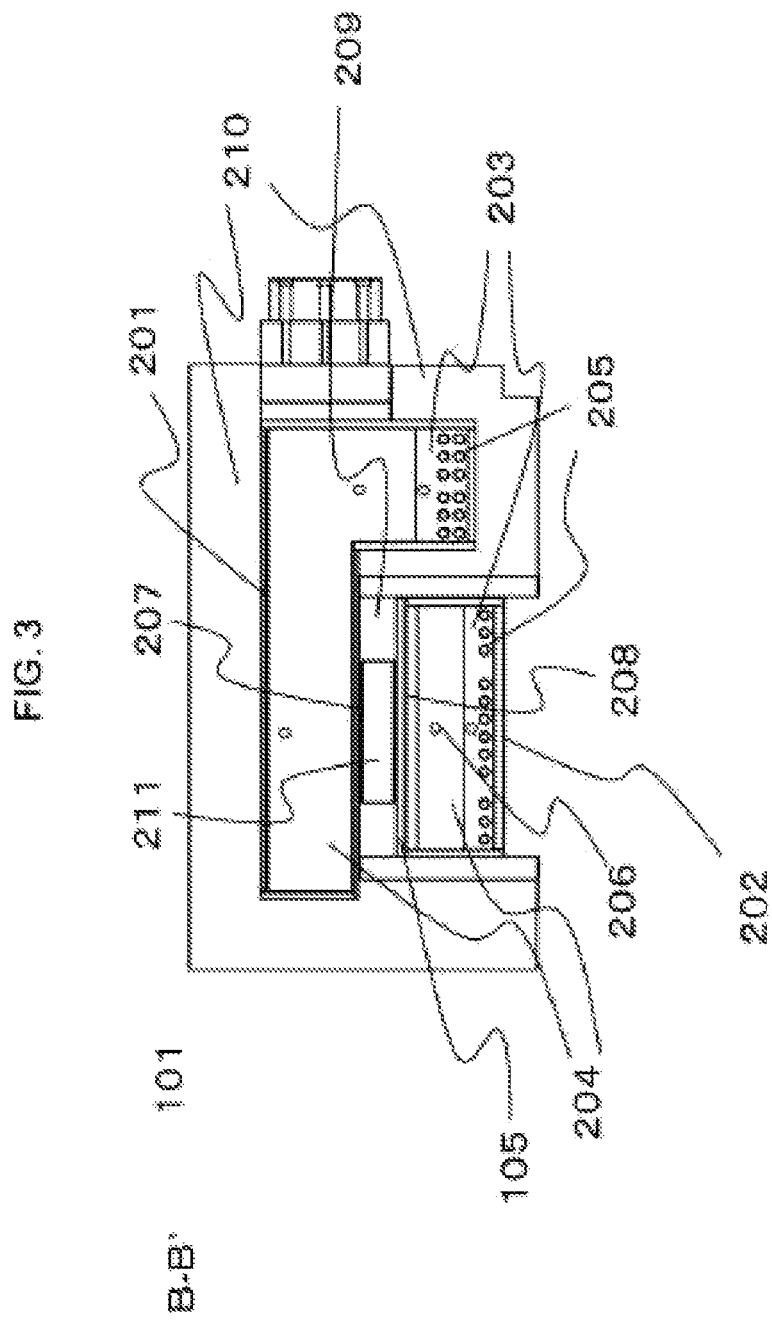
FIG. 3 is a cross-section view of B-B' section of heating apparatus shown in FIG. 1.
Figure 4:
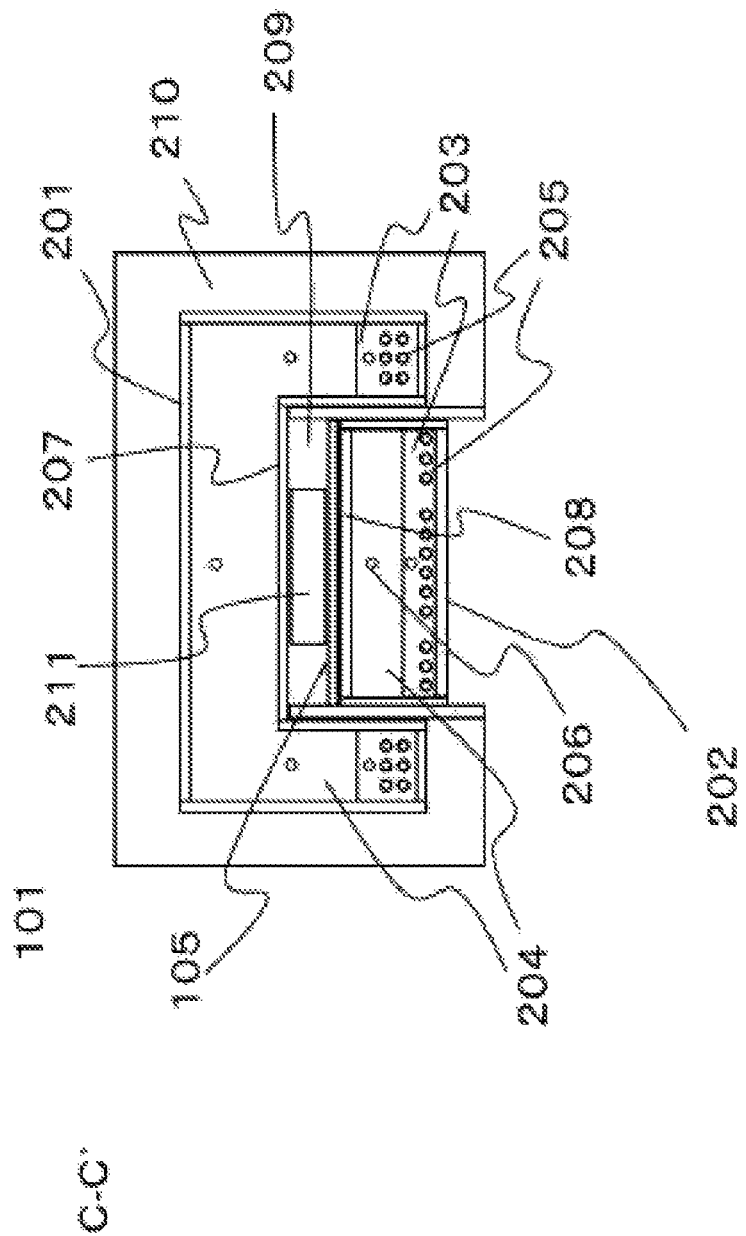
FIG. 4 is a cross-section view of C-C' section of heating apparatus shown in FIG. 1.

FIG. 1 is an overall view showing an example of our heating apparatus for sheets while FIG. 2 is a schematic side view of the heating apparatus. In FIGS. 1 and 2, symbol 101 indicates heating apparatus, symbol 102 indicates heating apparatus cabinet, symbol 103 indicates operation control panel, symbol 104 indicates door, symbol 105 indicates base material inlet/outlet, symbol 106 indicates slide part, symbol 107 indicates cylinder for elevating upper heating wall, symbol 201 indicates upper jacket, symbol 202 indicates lower jacket, symbol 203 indicates heat medium, symbol 204 indicates saturated steam, symbol 205 indicates heater for heat medium, symbol 206 indicates temperature sensor, symbol 207 indicates upper heating wall surface, symbol 208 indicates lower heating wall surface, symbol 209 indicates heat chamber, symbol 201 indicates keep-warm box and symbol 211 indicates thermoplastic resin sheet (base material).

Heating apparatus 101 comprises upper and lower jackets 201 and 202 housing heat medium. The upper jacket has a vertically-elevating function to bring the heating wall surface into contact with the base material. The jackets may have a shape corresponding to the shape and size of thermoplastic resin sheet to be heated. Jacket 201 may be configured to move in a direction other than the vertical direction.

Heating apparatus 101 is a heat medium gas-phase heating-type heating apparatus to indirectly heat the wall surface of heating apparatus with saturated steam of heat medium to heat the thermoplastic resin sheet above the melting point of the thermoplastic resin by bringing the lower and upper heating walls into contact with the thermoplastic resin sheet. Heating apparatuses of the heat medium gas-phase heating type belong to pressure vessel (jacket) having a safety device. The safety device of pressure detection-type detects inner pressure of the jacket to operate a microswitch in an operation temperature zone so that the pressure of the saturated steam of the heat medium in the jacket is kept constant to keep the temperature in the jacket constant.

Heating apparatus 101 has a box-like shape of which the front side has an opening. Door 104 has a sliding mechanism to slide the door to open or close the door so that the thermoplastic sheet is taken out smoothly. Slide part 106 comprises 2 pairs of fixed rails and movable rails. The movable rails having a plate shape are attached to the bottom of the door while the fixed rails having a plate shape are attached to the heating apparatus cabinet. The movable rail fitted in the fixed rail is supported slidably to back and front sides.

The door may be provided with base material inlet/outlet 105 on which base material is placed to be fed smoothly in heat chamber 209.

Upper part jacket 201 and lower part jacket 202 containing heat medium 203 used for the heat medium gas-phase heating are provided on the top and bottom of heat chamber 209. Heater 205 is a heat medium that vaporizes heat media 203 into saturated steam 204 by heating and is provided inside upper jacket 201 and lower jacket 202.

The heat medium gas-phase heating is a type of heating that uses saturated steam 204 of heat medium 203. This type of heating can keep the temperature in upper jacket 201 and lower jacket 202 constant so that heating walls 207 and 208 have uniform temperature.

Heater 205 for heat medium heating may be an electric heater. The temperatures inside upper jacket 201 and lower jacket 202 are controlled by turning ON and OFF heater 205 for heat medium 203 as monitoring the temperatures of heat medium in a gas phase to maintain saturated vapor pressure condition inside upper jacket 201 and lower jacket 202.

Heat medium 203 used with heating apparatus for the heat medium gas-phase heating may be an organic compound or an inorganic substance depending on the temperature range.

The organic compounds include polyvalent alcohols (glycerin, polyglycol), phenols or phenolic ethers (anisole, diphenyl ether, phenols), polyphenyls (terphenyl), chlorination benzene or polyphenyls (o-dichlor benzene, polychlor polyphenyl, Kanechlor), silicate esters (tetraallyl silicate), fractionated tar and petroleum oils (naphthalene derivative, mineral oil).

The inorganic substances include fused salts and fused metals (alloy). The fused salt may be based on nitrate, carbonate or chloride. The fused metal may be Hg, Na, Na—K (alloy), Pb or Pb—Bi (eutectic mixture).

Heating apparatus 101 employing contact-type heat medium gas-phase heating performs heating by bringing a sample into contact with a wall surface indirectly heated with saturated steam 204 of heat medium condensing at a low-temperature part of the sample to supply energy to a part requiring much energy so that a heating having function of so-called "self-sensing function (A)" can be performed.

Namely, heating apparatus 101 which is configured to indirectly heat the wall surface of heat medium heater with saturated steam of heat medium can heat thermoplastic sheet 211 by the self-sensing function at a target temperature without excessive heating over the set temperature.

Keep-warm box 210 with a lagging material surrounds upper and lower jackets 201 and 202 except for the heating wall surface to improve temperature uniformity and reduce energy loss.

Upper part jacket 201 of heating apparatus 101 can be vertically elevated with cylinder 107 to elevate the upper heating wall so that upper heating wall surface 207 can contact the base material. The upper jacket freely going up and down can bring the surface into contact with base materials having any thickness. Cylinder 107 may be attached to both sides of the jacket.

Thermoplastic resin sheet 211 may contain reinforcing fibers as well as thermoplastic matrix resin.

It is preferable that the reinforcing fiber is made of fiber selected from a group of carbon fiber, aramid fiber and glass fiber, although it is not limited thereto in particular. It is possible that one or more kinds thereof are used together. Above all, it is preferably made of carbon fiber capable of providing light composite materials excellent in strength. It is preferable that the carbon fiber is based on PAN, pitch or rayon and has an average fiber diameter of 3 to 12 μm, preferably 6 to 9 μm.

It is preferable that the reinforcing fiber is subject to a surface treatment for the purpose of improving adhesiveness with matrix resin in preparing fiber-reinforced composite material. The surface treatment may be electrolytic treatment, ozonation treatment, ultraviolet treatment or the like. It is possible to add a sizing agent for purposes such as prevention of reinforcing fibers from fluffing, improvement of reinforcing fiber strands in bundling and improvement of matrix resin in adhesiveness. Sizing agents include a compound having a functional group such as epoxy group, urethane group, amino group or carboxyl group. One or more kinds of them can be added together.

It is preferable that the sizing agent is adhered by 0.01 wt % or more in terms of solid content to the reinforcing fiber. It is more preferably 0.1 wt % or more, preferably 0.15 wt % or more. It is preferably less than 4 wt %, and is more preferably less than 3 wt %, preferably less than 2 wt %. The adhesion amount of sizing agent of less than 0.01 wt % might decrease surface adhesiveness between matrix and carbon fiber to deteriorate mechanical properties of composite material. On the other hand, the adhesion amount of sizing agent of 4 wt % or more might have a bad influence to the adhesiveness between matrix and carbon fiber.

The reinforcing fiber may have a fiber formation such as continuous fiber or chopped discontinuous fiber. It is possible that one or more kinds thereof are used together.

In continuous fiber, a laminate is prepared from reinforcing fibers oriented in directions such as single direction, quasi-isotropic direction, alternate direction of 0°/90° and random direction to make a desirable laminate configuration. It is possible that the laminate consists of notch-inserted prepregs or prepregs without a notch. The laminate may comprise both the notch-inserted prepreg and prepreg without a notch. The laminate may be made by spot-welding of adjacent layers of prepreg with an ultrasonic welding machine from a viewpoint of easy handling.

It is preferable that the thermoplastic resin-molded body is made from a laminate consisting of prepregs in which reinforcing fibers are oriented quasi-isotropically so that the anisotropic fluid can be reduced at the pressing process. It is preferable that the laminate has a laminate configuration of)(0°/45°/90°/−45° ns which means a symmetric laminate of n-times repetitive four layers of 0°/45°/90°/−45°, or)(0°/60°/−60° ns which means a symmetric laminate of n-times repetitive three layers of 0°/60°/−60°, where n indicates an integer of 1 or more while s indicates a symmetric laminate configuration. Such a quasi-isotropic laminate configuration can suppress warpage of the laminate. Further, multi-directional load is applied to fiber-reinforced composite structural materials. From a viewpoint of mechanical properties, the quasi-isotropic laminate configuration is also advantageous for general durability of fiber-reinforced composite.

In chopped fiber, a laminate is prepared from chopped fibers oriented by two-dimensionally random. Such a two-dimensionally random orientation can produce a molded body having a small anisotropy of physical properties and a small variability of mold warpage.

It is preferable that the chopped fiber has a weight average fiber length of 5 mm or more. It is more preferably 6 mm or more, preferably 10 mm more. It is preferably 100 mm or less. It is more preferably 50 mm or less, preferably 25 mm or less. The weight average fiber length of carbon fiber of less than 5 mm might deteriorate mechanical properties of fiber-reinforced resin forming material. On the other hand, the weight average fiber length of more than 100 mm might deteriorate formability.

The thermoplastic resin sheet contains a resin component of thermoplastic resin. The use of thermoplastic resin can make productivity excellent because of short-time forming by cooling solidification to form a predetermined shape without a chemical reaction. Further, the use of a thermoplastic resin can improve strength such as impact resistance in particular because of its toughness generally greater than that of thermosetting resin. The thermoplastic resin having such suitable characteristics may be a polyester such as polyethylene terephthalate (PET) resin, polybutylene terephthalate (PBT) resin, poly trimethylene terephthalate (PTT) resin, polyethylene naphthalate (PEN) resin or liquid crystalline polyester resin, a polyolefin such as polyethylene (PE) resin, polypropylene (PP) resin or polybutylene resin, a styrene-based resin, polyoxymethylene (POM) resin, polyamide (PA) resin, polycarbonate (PC) resin, polymethylmethacrylate (PMMA) resin, polyvinyl chloride (PVC) resin, polyphenylene sulfide (PPS) resin, polyphenylene ether (PPE) resin, modified PPE resin, polyimide (PI) resin, polyamide-imide (PAI) resin, polyetherimide (PEI) resin, polysulfone (PSU) resin, modified PSU resin, polyether sulfone resin, polyketone (PK) resin, polyether ketone (PEK) resin, polyetheretherketone (PEEK) resin, polyether ketone (PEKK) resin, polyarylate (PAR) resin, polyether nitrile (PEN) resin, phenol-based resin, phenoxyresin, a fluorinated resin such as polytetrafluoroethylene resin, polystyrene-based resin, polyolefin resin, polyurethane-based resin, polyester-based resin, polyamide-based resin, polybutadiene-based resin, polyisoprene-based resin, a thermoplastic elastomer made of fluorinated resin or the like, a copolymer or a modification thereof, a blend of 2 or more kinds thereof or the like. From the viewpoints of heat and chemical resistance, it is preferable to employ polycarbonate resin or styrene-based resin. From the viewpoints of strength and impact resistance of a molded body, it is preferable to employ polyamide resin. Further, it is preferable to blend inorganic antioxidant with polyamide used as thermoplastic resin.

It is preferable that an inorganic antioxidant is added to the thermoplastic resin so that improved heat resistance can prevent oxidation degradation of the resin, which tends to occur in heating the base material in the forming process, while improving the surface appearance and strength of a molded body.

It is preferable that the inorganic antioxidant is added by 0.01 to 1 parts by weight to polyamide of 100 parts by weight. The addition amount of less than 0.01 parts by weight might not improve heat resistance sufficiently while the addition amount of more than 1 part by weight might not contribute to remarkable improvement. The inorganic antioxidant may be copper halide or its derivative. It is preferable to employ copper iodide to improve heat resistance of polyamide.

The reinforcing fiber may be impregnated with thermoplastic resin as a matrix resin by an impregnation pressing machine although it is not limited thereto in particular. The pressing machine should achieve a temperature and pressure required to perform matrix resin impregnation. It is possible to employ a general pressing machine having a planar platen going up and down or a so-called double belt press machine having a mechanism of running a pair of endless steel belts. In such an impregnation process, a discontinuous fiber mat may be laminated with a film or nonwoven or woven sheet made of matrix resin to perform matrix resin melting/impregnation by the above-described pressing machine. It is possible that particles of matrix resin are dispersed on the reinforcing fiber mat to prepare a laminate. It is also possible that particles of matrix resin are dispersed and blended inside the mat together with the chopped reinforcing fiber bundles.

It is preferable that the fiber-reinforced resin forming material contains the reinforcing fiber of 20 to 70 vol % to the total volume. When the volume content of reinforcing fiber is insufficient, the fiber-reinforced resin forming material tends to have insufficient mechanical properties. On the other hand, when the volume content of reinforcing fiber is excessive, the fiber-reinforced resin forming material tends to have insufficient formability in spite of improved mechanical properties. It is more preferable that the fiber-reinforced resin forming material contains the reinforcing fiber of 25 to 50 vol %.

Next, the manufacturing method of thermoplastic resin-molded body using heating apparatus 101 will be explained. The temperature in heat chamber 209 is preliminarily increased by heating heat medium 203 in heating apparatus 101. Thermoplastic resin sheet 211 is fed onto heated lower heating wall surface 208 of heating apparatus 101 and then upper jacket 201 is lowered to bring upper heating wall surface 207 and lower heating wall surface 208 into contact with thermoplastic resin sheet 211 by heat transfer so that thermoplastic resin sheet 211 is melted at a temperature above the melting point.

Although thermoplastic resin sheet 211 directly placed on lower heating wall surface 208 can be fed into heat chamber 209 as described above, it is also possible that heat chamber 209 is provided with base material inlet/outlet 105 onto which thermoplastic resin sheet 211 is fed into heat chamber 209, from viewpoints of mold release characteristics and handling ability when melted resin sheet is taken out from heating apparatus 101 after heating. Base material inlet/outlet 105 may be made of metal sheet or resin sheet which neither deforms nor melts within a heating temperature range. The metal sheet may have the form of a flat plate, wire mesh or punching metal, or a processed metal sheet such as an embossed metal sheet. Base material inlet/outlet 105 having a large contact area to the thermoplastic resin sheet can increase the temperature faster with less variability of temperature. On the other hand, the smaller the contact area is the better the mold release characteristics are. It can be freely designed by considering the balance among forming cycle, temperature precision and the like.

In the manufacturing method of thermoplastic resin sheet, it is possible that two or more thermoplastic resin sheets 211 are simultaneously heated with heating apparatus 101 to fuse above the melting point of the thermoplastic resin. Such simultaneously heated thermoplastic resin sheets 211 may have the same volume and the same specific heat, or alternatively have different volumes or specific heats. When the thermoplastic resin sheets fed to a general heating apparatus have different volumes or specific heats, such simultaneously heated sheets make a difference between temperatures of the sheets. When using a general heating apparatus, such a temperature difference generated should be eliminated by raising the lowest temperature of low-temperature thermoplastic resin sheet above the melting point of the resin. However, such a risen temperature might increase the preheating time to deteriorate physical properties and appearances because of overheating. Our heat medium gas-phase heating-type heating apparatus 101 has self-sensing function (A) capable of heating a low-temperature part selectively without overshooting so that thermoplastic resin-molded body can be formed without deteriorating physical properties and appearances derived from overheat even when thermoplastic resin sheets having different volumes, different specific heats or different heat capacities are simultaneously heated.

It is possible that two or more thermoplastic resin sheets 211 are simultaneously heated with heating apparatus 101, wherein thermoplastic resin sheets 211 are disposed without overlap or overlapped. Thermoplastic resin sheets 211 to be heated may be partially or entirely overlapped. When partially-overlapped thermoplastic resin sheets are simultaneously heated with a general heating apparatus, the temperature of overlap of thermoplastic resin sheet rises slowly to make a temperature difference between the overlapped part and the other part so that the physical properties and appearance might be deteriorated because of overheating. Our heat medium gas-phase heating-type heating apparatus 101 having a unique self-sensing function can uniformly heat the sheet regardless of partial overlapping in the sheet. Because even preliminarily laminated base materials having different volumes or different specific heats can be heated, cycle time can be shortened and the temperature of the heated base material can be prevented from being lowered by omitting the laminating process when base material is charged into the die after the heating process.

Fused thermoplastic resin sheet 211 heated with heating apparatus 101 above the melting point is taken out from heating apparatus 101, and then set in a molding die consisting of an upper and lower die to be clamped with which the sheet is pressurized to be cooled and solidified to make a thermoplastic resin-molded body by performing the stamping forming.

It is preferable that the stamping forming is performed at a molding die temperature of (Tc-10) ° C. or more and 25° C. or less, where Tc is solidification temperature of thermoplastic resin of thermoplastic resin sheet 211. The die temperature should be higher from a viewpoint of formability while it should be lower from a viewpoint of molded body stability such as warpage of molded body.

From the viewpoints of facility and base material flow, it is preferable that the stamping forming is performed at a pressure of 0.1 MPa or more. It is more preferably 0.5 MPa or more, preferably 1 MPa or more. It is preferably 40 MPa or less, and is more preferably 20 MPa or less, preferably 10 MPa or less. The pressure of less than 0.1 MPa might not sufficiently pressurize thermoplastic resin sheet 211 to cause trouble such as short shot, air bubble, deteriorated surface quality or deteriorated development of the physical properties. The pressure of more than 40 MPa might require bigger pressing facilities or stronger dies or might make optionally contained reinforcing fibers broken to deteriorate development of the physical properties.

The molding die may have a shape of a flat plate or a complicated three-dimensional shape. A shape having ribs or bosses can be advantageously formed by our heating apparatus. Heating apparatus 101 having self-sensing function (A) capable of heating a low-temperature part selectively without overshooting can easily form the shape of rib or boss without deteriorating physical properties and appearances derived from overheat in heating apparatus 101 by uniformly heating a preliminarily laminated thermoplastic resin sheet having a volume corresponding to the ribs or bosses to be fed directly into the die separately from the above-described thermoplastic resin sheet for overall forming even when thermoplastic resin sheets having different volumes, different specific heats or different heat capacities are simultaneously heated. Further, the laminating process before feeding a thermoplastic resin sheet into the molding die can be omitted so that a shortened forming cycle and low cost are expected while preventing molding defects caused by cooling the thermoplastic resin sheet to be fed into the molding die. We can thus manufacture a thermoplastic resin-molded body excellent in surface appearance having a complicated three-dimensional shape such as tall ribs by using the heating apparatus under the above-described condition.

EXAMPLES

Hereinafter, our apparatus and methods will be explained with reference to Examples and Comparative Examples although this disclosure is not limited thereto in particular.
(1) Raw Materials
Fiber (F): Continuous carbon fiber bundle ("PX35 (registered trademark)" made by ZOLTEK company) having fiber diameter of 7.2 μm, tensile elastic modulus of 240 GPa and single yarn number of 50,000. Matrix resin (M): Polyamide resin (made by Toray Industries, Inc., "Amilan (registered trademark) CM1001")
(2) Manufacture of Base Material Fibers (F) are continuously inserted into a rotary cutter of which a cutting blade is inclined by a 15° angle to the longitudinal direction of fiber bundles, to cut the fiber bundles into chopped fiber bundles (A) having fiber length of 12.7 mm, width of 1 mm, thickness of 0.1 mm and fiber number of 1,000.

Following the cutting step, chopped fiber bundles (A) are sprayed to be dispersed uniformly to make a random mat having an isotropic fiber orientation. Such obtained discontinuous fiber mat has basis weight of 1,270 g/m$^2$.

The discontinuous fiber mat is impregnated with matrix resin (M) by a pressing machine at 280° C. and 3 MPa for 5 min and then cooled down to make a base material of fiber-reinforced thermoplastic resin composite material.
(3) Vf (Carbon Fiber Content in Fiber-Reinforced Resin Forming Material)

Figure 5:
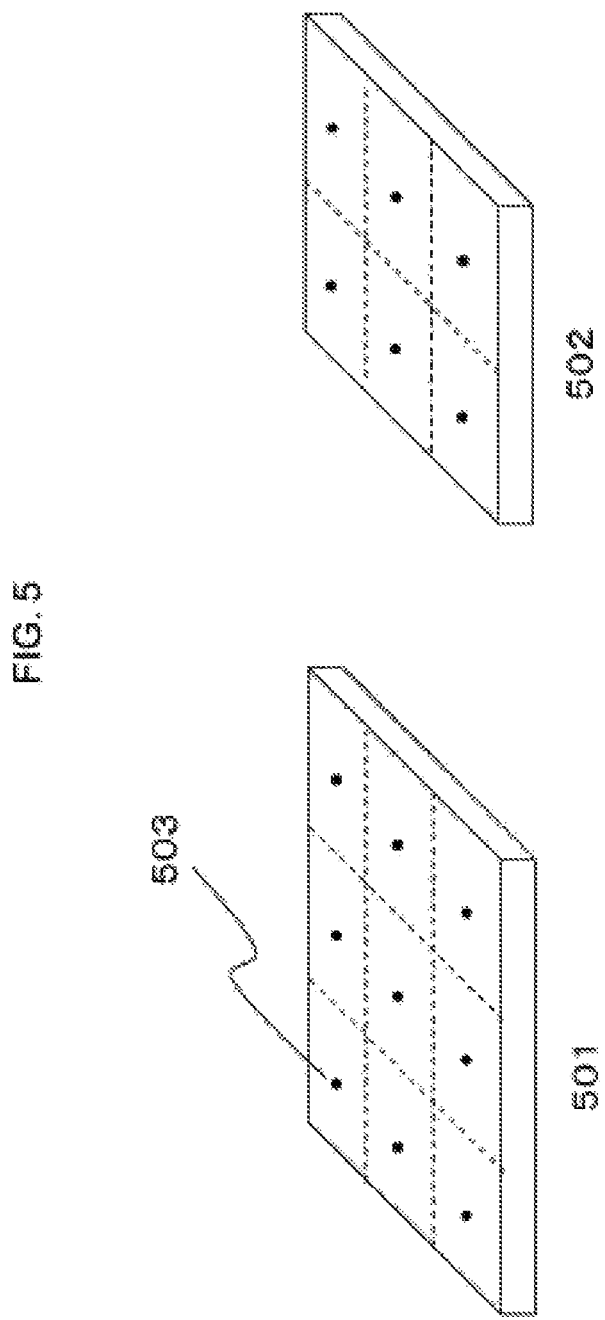
FIG. 5 is a schematic view showing thermometric materials.

The mass of a sample of about 2 g cut out of stampable base material is measured. The sample is heated in an electric furnace at 500° C. for 1 hour to burn out organic substance such as matrix resin. It is cooled down to room temperature to measure the mass of residual carbon fiber. The carbon fiber content (%) is calculated by determining a mass ratio of the carbon fiber to the sample before burning out organic substance such as matrix resin. The volume content of the sample is determined as 35 vol %.
(4) Heating Apparatus Three types of heating apparatuses are used as follows:
IR heating apparatus: heating apparatus of far-infrared heater-type
Gas-phase heating apparatus 1: heating apparatus of heat medium gas-phase heating-type only by radiation heating without vertically-elevating function of upper jacket
Gas-phase heating apparatus 2: heating apparatus of heat medium gas-phase heating-type capable of contact heating by upper and lower heating walls with vertically-elevating function of upper jacket.
(5) Measurement Method of Heated Base Material Temperature Base materials having size of 180 mm×180 mm×2 mm (material a) and 180 mm×120 mm×2 mm (material b) are used. Top and bottom faces of the base material is equally divided into areas of 60 mm×60 mm. A row or stack consisting of two of such divided base materials in which thermocouples are set at the center as shown in FIG. 5 are subject to IR heating at 320° C., gas-phase heating 1 and gas-phase heating 2 both at 290° C. to measure the outer layer temperature and inner layer temperature of base material. The total temperature variability is evaluated when the temperature of entire base material reaches 280° C., and the heatup time for reaching 280° C. is measured.

(6) Evaluation of Matrix Deterioration

Thermal deterioration of nylon 6 is evaluated by relative viscosity ($\eta r$).

The evaluation is based on retention rate of $\eta r$ calculated from the rate of $\eta r$ before and after heating because nylon 6 reduces molecular weight and relative viscosity when pyrolyzed.

Retention rate of $\eta r$ (%)=$\eta r$ after heating/$\eta r$ before heating

The sample for measuring $\eta r$ of outer layer and inner layer after heating is prepared by rapidly cooling with water the base material which has completed temperature measurement and solidifying the base material to be divided into three sections in the thickness direction. Such divided measurement samples dried up in vacuum are dissolved in 98% sulfuric acid and are filtrated to remove carbon fibers. The filtrated sulfuric acid is subject to measurement with an Ostwald viscometer to calculate $\eta r$.

(7) Evaluation of Formability (Stamping Forming)

Figure 6:
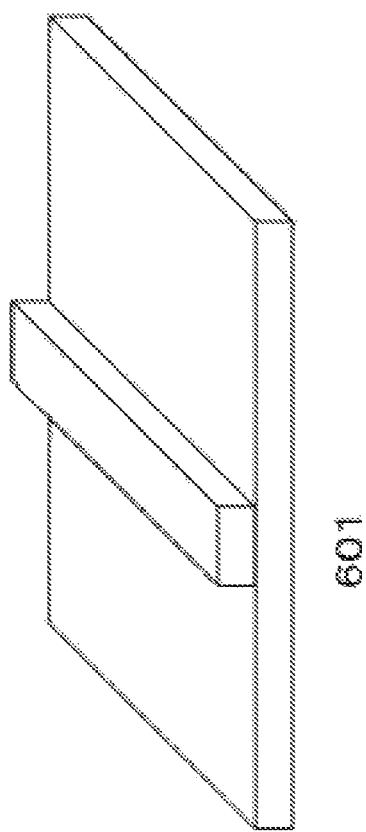
FIG. 6 is a schematic view showing a molding material.

Base materials having size of 40 mm (length)×270 mm (width)×2 mm (thickness) and size of 360 mm (length)×270 mm (width)×2 mm (thickness) are rowed or stacked to be heated to 280° C. of base material center temperature (temperature at the center of the stack in forming material stack of two base materials shown in FIG. 6) with a rib-forming die consisting of lower die having a shape of flat plate of 400 mm (length)×300 mm (width) and upper die having size of 400 mm (length)×300 mm (width) provided with a groove extending in the width direction and having groove size of 40 mm (height)×2 mm (rib base width) inclined by 1° and positioned at the lengthwise center. Two base materials are pressurized at 2.5 MPa for 30 sec at the center of the die heated to 150° C. The parts of die area (400 mm×300 mm) and rib are observed to evaluate if the level of charge and surface burn is Good (Practicable level with fully-charged resin and no burnt resin on surface) or NG (Unpractical level with insufficiently-charged resin or burnt resin on surface).

Comparative Example 1

Two sheets of material a disposed in parallel were heated with an IR heating apparatus to evaluate temperature variability, heatup time, retention rate of $\eta r$ and formability. Results such as great temperature variability of 10° C. at maximum in the base material and heatup time of 4.5 min were obtained. The resin was deteriorated on the base material surface according to retention rate of $\eta r$ determined as 68.9% on outer layer and 71.7% on inner layer. The molded body appearance was NG because of partially burnt resin of molded body. Accordingly, comprehensive evaluation was NG (Unpractical level) from these results.

Comparative Example 2

The evaluation was performed in the same manner as Comparative Example 1 except that the two sheets were stacked. Results such as great temperature variability of 13° C. at maximum in base material and heatup time of 7 min were obtained. The resin was deteriorated on the base material surface according to retention rate of $\eta r$ determined as 64.5% on outer layer and 72.4% on inner layer. The molded body appearance was NG because of partially burnt resin of molded body. Accordingly, comprehensive evaluation was NG (Unpractical level) from these results.

Comparative Example 3

The evaluation was performed in the same manner as Comparative Example 1 except that the two sheets of material a and material b were disposed in parallel. Results such as much great temperature variability of 15° C. at maximum in the base material and heatup time of 4.5 min were obtained. The resin was deteriorated on the base material surface according to retention rate of $\eta r$ determined as 67.5% on outer layer and 72.4% on inner layer. The molded body appearance was NG because of insufficiently-charged and burnt resin in the rib part of molded body. Accordingly, comprehensive evaluation was NG (Unpractical level) from these results.

Comparative Example 4

The evaluation was performed in the same manner as Comparative Example 3 except that the two sheets were stacked. Results such as much great temperature variability of 20° C. at maximum in the base material and heatup time of 6.5 min were obtained. The resin was deteriorated on the base material surface according to retention rate of $\eta r$ determined as 63.0% on outer layer and 70.1% on inner layer. The molded body appearance was NG because of insufficiently-charged and much burnt resin in the rib part of molded body. Accordingly, comprehensive evaluation was NG (Unpractical level) from these results.

Comparative Example 5

The evaluation was performed in the same manner as Comparative Example 1 except that the two sheets were heated with gas-phase heating apparatus 1. Results such as temperature variability of 3° C. at maximum in the base material and much heatup time of 15 min were obtained. The resin was in a good condition on the base material surface according to retention rate of $\eta r$ determined as 72.0% on outer layer and 72.1% on inner layer. The molded body appearance was Good because of fully-charged and no burnt resin of molded body. Accordingly, comprehensive evaluation was NG (Unpractical level) from these results.

Comparative Example 6

The evaluation was performed in the same manner as Comparative Example 5 except that the two sheets were stacked. Results such as temperature variability of 3° C. at maximum in base material and much heatup time of 20 min were obtained. The resin was in a good condition on the base material surface according to retention rate of $\eta r$ determined as 71.6% on the outer layer and 71.7% on the inner layer. The molded body appearance was Good because of fully-charged and no burnt resin of molded body. Accordingly, comprehensive evaluation was NG (Unpractical level) from these results.

Comparative Example 7

The evaluation was performed in the same manner as Comparative Example 5 except that the two sheets of material a and material b were disposed in parallel. Results such as temperature variability of 2° C. at maximum in the base material and much heatup time of 12 min were obtained. The resin was in a good condition on the base material surface according to retention rate of ηr determined as 70.5% on outer layer and 70.9% on inner layer. The molded body appearance was Good because of fully-charged and no burnt resin of molded body. Accordingly, comprehensive evaluation was NG (Unpractical level) from these results.

Comparative Example 8

The evaluation was performed in the same manner as Comparative Example 7 except that the two sheets were stacked. Results such as temperature variability of 3° C. at maximum in the base material and much heatup time of 16 min were obtained. The resin was in a good condition on the base material surface according to retention rate of ηr determined as 71.2% on outer layer and 71.5% on inner layer. The molded body appearance was Good because of fully-charged and no burnt resin of molded body. Accordingly, comprehensive evaluation was NG (Unpractical level) from these results.

Example 1

The evaluation was performed in the same manner as Comparative Example 1 except that the two sheets were heated with gas-phase heating apparatus 2. Results of both good temperature variability of 2° C. at maximum in the base material and heatup time of 3 min were obtained. The resin was in a good condition on the base material surface according to retention rate of ηr determined as 72.2% on outer layer and 72.4% on inner layer. The molded body appearance was Good because of fully-charged and no burnt resin of molded body. Accordingly, comprehensive evaluation was Good (Practicable level) from these results.

Example 2

The evaluation was performed in the same manner as Example 1 except that the two sheets were stacked. Results of both good temperature variability of 2° C. at maximum in the base material and heatup time of 4 min were obtained. The resin was in a good condition on the base material surface according to retention rate of ηr determined as 73.6% on outer layer and 73.7% on inner layer. The molded body appearance was Good because of fully-charged and no burnt resin of molded body. Accordingly, comprehensive evaluation was Good (Practicable level) from these results.

Example 3

The evaluation was performed in the same manner as Example 1 except that the two sheets of material a and material b were disposed in parallel. Results such as temperature variability of 3° C. at maximum in the base material and much heatup time of 3 min were obtained. The resin was in a good condition on the base material surface according to retention rate of ηr determined as 73.1% on outer layer and 73.4% on inner layer. The molded body appearance was Good because of fully-charged and no burnt resin of molded body. Accordingly, comprehensive evaluation was Good (Practicable level) from these results.

Example 4

The evaluation was performed in the same manner as Example 3 except that the two sheets were stacked. Results of both good temperature variability of 2° C. at maximum in the base material and heatup time of 4 min were obtained. The resin was in a good condition on the base material surface according to retention rate of ηr determined as 71.7% on outer layer and 71.8% on inner layer. The molded body appearance was Good because of fully-charged and no burnt resin of molded body. Accordingly, comprehensive evaluation was Good (Practicable level) from these results.

TABLE 1

| Item | | Unit | Comparative Example 1 | Comparative Example 2 | Comparative Example 3 | Comparative Example 4 | Comparative Example 5 | Comparative Example 6 |
|---|---|---|---|---|---|---|---|---|
| Preheat equipment | | — | IR | IR | IR | IR | Gas phase 1 | Gas phase 1 |
| Material 1 | | — | a | a | a | a | a | a |
| Material 2 | | — | a | a | b | b | a | a |
| Lamination | | — | Row | Stack | Row | Stack | Row | Stack |
| Temperature variability | | ° C. | 10 | 10 | 15 | 20 | 3 | 3 |
| Heatup time | | min | 4.5 | 7 | 4.5 | 6.5 | 15 | 20 |
| Retention rate of ηr | Outer layer | % | 68.9 | 64.5 | 67.5 | 63.0 | 72 | 71.6 |
| | Inner layer | | 71.7 | 72.4 | 72.0 | 70.1 | 72.1 | 71.7 |
| Molded body appearance | | | Δ (Acceptable) | Δ (Acceptable) | x (NG) | x (NG) | ○ (Good) | ○ (Good) |
| Comprehensive evaluation | | | x NG) | x (NG) | x (NG) | x (NG) | x (NG) | x (NG) |

| Item | | Comparative Example 7 | Comparative Example 8 | Example 1 | Example 2 | Example 3 | Example 4 |
|---|---|---|---|---|---|---|---|
| Preheat equipment | | Gas phase 1 | Gas phase 1 | Gas phase 2 | Gas phase 2 | Gas phase 2 | Gas phase 2 |
| Material 1 | | a | a | a | a | a | a |
| Material 2 | | b | b | a | a | b | b |
| Lamination | | Row | Stack | Row | Stack | Row | Stack |
| Temperature variability | | 2 | 3 | 2 | 2 | 3 | 2 |

TABLE 1-continued

|  |  |  |  |  |  |  |  |
|---|---|---|---|---|---|---|---|
| Heatup time | | 12 | 16 | 3 | 4 | 3 | 4 |
| Retention rate of $\eta r$ | Outer layer | 70.5 | 71.2 | 72.2 | 73.6 | 73.1 | 71.7 |
| | Inner layer | 70.9 | 71.5 | 72.4 | 73.7 | 73.4 | 71.8 |
| Molded body appearance | | ○ (Good) | ○ (Good) | ○ (Good) | ○ (Good) | ○ (Good) | ○ (Good) |
| Comprehensive evaluation | | x (NG) | x (NG) | ○ (Good) | ○ (Good) | ○ (Good) | ○ (Good) |

INDUSTRIAL APPLICATIONS

Our apparatus and methods are applicable to any purpose requiring extremely uniform and high-speed heating. Specifically for thermal forming purpose of a thermoplastic resin sheet, a thermoplastic resin-molded body having a three-dimensional complicated shape excellent in physical properties and surface appearance can be manufactured by high-precision temperature control.

The invention claimed is:

1. A method of manufacturing a thermoplastic resin-molded body, comprising:
a step of heating a thermoplastic resin sheet to be fused above a melting point of the thermoplastic resin with the heating apparatus;
a step of clamping a molding die comprising an upper die and a lower die to pressurize the fused thermoplastic resin sheet; and
a step of cooling the pressurized thermoplastic resin sheet to be solidified to make a thermoplastic resin-molded body,
wherein the heating apparatus comprises a vertically-movable heating wall indirectly heated with a saturated steam of a heat medium that heats the thermoplastic resin sheet above the melting point of the thermoplastic resin by bringing the heating wall into contact with the thermoplastic resin sheet.

2. The method according to claim 1, wherein two or more of the thermoplastic resin sheets are simultaneously heated and fused with the heating apparatus in the step of heating.

3. The method according to claim 2, wherein the heating apparatus has a self-sensing function (A) capable of selectively heating a low-temperature part.

4. The method according to claim 2, wherein the thermoplastic resin sheets have different heat capacities and are disposed without being overlapped in the step of heating.

5. The method according to claim 2, wherein the thermoplastic resin sheets have different heat capacities and are stacked in the step of heating.

6. The method according to claim 2, wherein the thermoplastic resin sheets have different heat capacities in the step of heating, the molding die has a rib shape, and the thermoplastic resin-molded body having the rib shape is made in the step of cooling.

7. The method according to 2, wherein the thermoplastic resin sheets have different heat capacities in the step of heating, the molding die has a boss shape, and the thermoplastic resin-molded body having the boss shape is made in the step of cooling.

8. The method according to claim 1, wherein the thermoplastic resin sheet is made of a fiber-reinforced thermoplastic resin made from a thermoplastic resin and reinforcing fibers.

9. The method according to claim 8, wherein the reinforcing fibers include carbon fibers, glass fibers or aramid fibers.

10. A heating apparatus that heats a thermoplastic resin sheet, comprising an upper jacket comprising a pressure vessel that houses a heat medium and has a vertically-movable heating wall that is indirectly heated with a saturated steam of the heat medium vaporized by a heater provided inside the upper jacket and heats the thermoplastic resin sheet above a melting point of the thermoplastic resin by bringing the heating wall into contact with the thermoplastic resin sheet.

11. The heating apparatus according to claim 10, having a self-sensing function (A) capable of selectively heating a low-temperature part.

12. The heating apparatus according to claim 10, wherein the heat medium is an organic compound.

13. The heating apparatus according to claim 10, wherein the heat medium is an inorganic compound.

* * * * *